A. W. WILKINSON.
Improvement in Illuminating Gas.
No. 4,821. Reissued March 19, 1872.
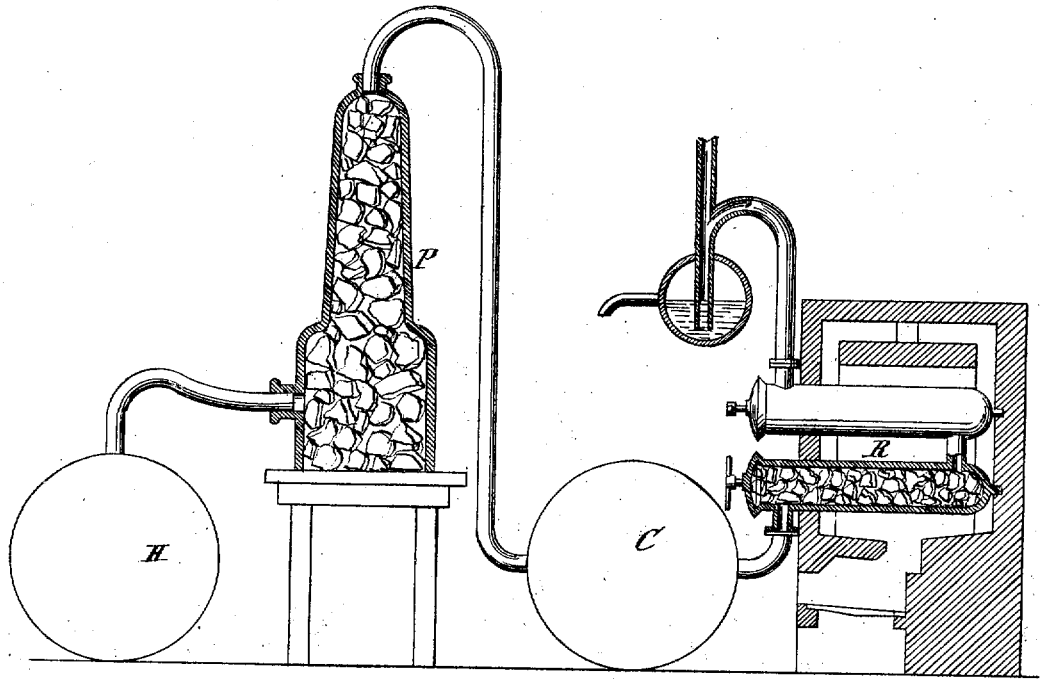
Witnesses.
C. Wahlers.
Ernst Bilhuber.
Inventor:
Asa W. Wilkinson
per
Van Santvoord & Hauff
Attys

UNITED STATES PATENT OFFICE.

ASA W. WILKINSON, OF NEW YORK, N. Y., ASSIGNOR TO HIMSELF AND PHILIP H. STEVENS.

IMPROVEMENT IN THE MANUFACTURE OF ILLUMINATING GAS.

Specification forming part of Letters Patent No. 123,538, dated February 6, 1872; reissue No. 4,821, dated March 19, 1872.

*To all whom it may concern:*

Be it known that I, ASA W. WILKINSON, of the city, county, and State of New York, have invented a new and useful Improvement in Illuminating Gas; and I do hereby declare the following to be a full, clear, and exact description thereof, which will enable those skilled in the art to make and use the same, reference being had to the accompanying drawing forming part of this specification, which drawing represents a sectional view of the apparatus which I have used in carrying out the invention.

This invention consists in passing hydrogen gas first through purifiers, which frees the same from all impurities containing oxygen, such as water (HO) or carbonic acid, (CO;) then through a carbureter, kept at the required temperature, containing any of the well-known hydrocarbons, such as naphtha, gasoline, &c., whereby the purified hydrogen gas becomes mechanically mixed with hydrocarbon vapors; which mixture is finally passed through a red-hot retort, whereby it becomes a permanent gaseous chemical compound of superior illuminating qualities.

In carrying out my invention I prepare hydrogen gas by any of the well-known methods—that is to say, either by means of zinc and diluted sulphuric acid, or by means of hydrate of lime and carbonic oxide. The hydrogen gas obtained by any of these methods is not chemically pure. It is generally mixed with vapors of water or carbonic oxide, or with both; and if the gas, in this impure state, is passed through a carbureter containing hydrocarbon and then through a red-hot retort, the water becomes decomposed, and its oxygen combines with a portion of the carbon taken from the hydrocarbon vapors, forming various acids or compounds, which, when mixed with the illuminating gas, materially deteriorate its illuminating power; or if the hydrogen is mixed with carbonic oxide this gas, in passing through the red-hot retort with the hydrocarbon, drops a portion of its carbon and becomes converted into carbonic or other acid, which all greatly injures the illuminating powers. The discovery of these facts forms the real base of my invention, and I have succeeded in producing a cheap and superior illuminating gas by the following process:

If the hydrogen gas contains the vapor of water, I pass it from the receiver H through one or more purifiers, P, containing chloride of calcium, caustic lime, or other suitable material capable of absorbing the watery vapors. If the hydrogen gas contains carbonic oxide I pass it through purifiers containing hydrate of lime or its equivalent at a red heat to absorb this impurity. After the hydrogen gas has been purified I pass it through a carbureter, C, containing the hydrocarbon, so constructed that the temperature can be raised to any point that may be required to generate the vapor of the hydrocarbon in sufficient quantity, forming, however, a mere mechanical mixture, which cannot be passed through pipes and consumed like a permanent gas, because on being passed through pipes exposed to a low temperature the hydrocarbon vapors condense and the illuminating power of the mixture is lost or greatly diminished. The mixture of hydrocarbon vapors and hydrogen gas is finally converted into a permanent gas by passing it through one or more retorts, R, heated to a red heat, and filled with coal, pieces of brick, iron-turnings, or other refractory material, whereby the current of the gas is broken and the same is uniformly heated. I prefer iron-turnings, for the reason of its ability to absorb oxygen, if any be present. On leaving the retort the gas mixture has become a permanent gas of superior illuminating quality, as will be readily understood from the following formula—as, for example: One of the hydrocarbon vapors is composed of $C_{24}H_{30}$, and if to this I add six equivalents of hydrogen gas I obtain $C_{24}H_{30}$ and $H_6 = 6(C_2H_2)+12(CH_2.)$ If I add ten equivalents of hydrogen gas I obtain $C_{24}H_{30}$ and $H_{10} = 4(C_2H_2)+16(CH_2;)$ or even if I add eighteen equivalents I still have the formula of light carbureted hydrogen $C_{24}H_{30}+H_{18}=24(CH_2.)$ In fact a much larger proportion of hydrogen may be used and a permanent gas produced, which will have a high illuminating power far exceeding the ordinary coal-gas. Thus I have within my power the facility to make a gas of any illuminating standard that may be required; and since the illuminating power of a hydrocarbon gas, when pure, is in proportion to its specific gravity, the superior qualities of my gas will be readily conceded, if it is considered that one hundred cubic inches of $C_2H_2$ weigh thirty grains, one hundred cubic inches of $CH_2$ seventeen grains, and one hundred cubic inches of the ordinary coal-gas, which is a mixture of several gases, which increases its specific gravity, without adding illuminating power, weigh from twelve to fifteen grains. And, furthermore, it is a well-known fact that coal-gas is contaminated by vapors of chloride of sodium, sulphur compounds, and other impurities, which impart to the flame a yellow tint, and contaminate the air of the apartments in which it is burned with deleterious and destructive vapors, while the flame of my gas is white and brilliant, and, being pure hydrocarbon, cannot produce any of these destructive compounds. In passing illuminating gas through lime purifiers some of the most valuable illuminating compounds are absorbed. My gas requires no purification; but at the same time it contains a sufficient amount of odorous materials to be recognized in case of leakage.

I do not claim, broadly, as my invention the manufacture of illuminating gas by passing hydrogen gas, mixed with hydrocarbon, through a heated retort; but

What I claim as new, and desire to secure by Letters Patent, is—

The within-described process of converting hydrogen into illuminating gas by first freeing the same from all impurities containing oxygen, then mixing it with hydrocarbons, and finally passing this mixture through a red-hot retort, substantially in the manner set forth.

A. W. WILKINSON.

Witnesses:
W. HAUFF,
E. F. KASTENHUBER.